United States Patent [19]

Ishiguro et al.

[11] Patent Number: 4,788,641

[45] Date of Patent: Nov. 29, 1988

[54] MAGNETIC TAPE PREFETCH CONTROL SYSTEM DYNAMICALLY VARYING THE SIZE OF THE PREFETCHED BLOCK

[75] Inventors: Masayuki Ishiguro, Kawasaki; Noboru Ohwa, Yokohama, both of Japan

[73] Assignee: Fujitsu Limited, Kawasaki, Japan

[21] Appl. No.: 897,918

[22] Filed: Aug. 19, 1986

[30] Foreign Application Priority Data

Aug. 20, 1985 [JP] Japan ................................. 60-182820

[51] Int. Cl.[4] ............................................. G06F 13/10
[52] U.S. Cl. ................................................... 364/200
[58] Field of Search ... 364/200 MS File, 900 MS File, 364/400; 360/69, 137

[56] References Cited

U.S. PATENT DOCUMENTS

| | | | |
|---|---|---|---|
| 3,383,660 | 5/1968 | Herold et al. | 364/200 |
| 4,040,026 | 8/1977 | Gernelle | 364/200 |
| 4,330,844 | 5/1982 | Dubuc | 364/900 |
| 4,500,965 | 2/1985 | Gray | 364/900 X |
| 4,644,463 | 2/1987 | Hotchkin et al. | 364/200 |

*Primary Examiner*—Archie E. Williams, Jr.
*Assistant Examiner*—Florin Munteanu-Ramnic
*Attorney, Agent, or Firm*—Staas & Halsey

[57] ABSTRACT

A magnetic tape system includes a driving unit (1) including a magnetic head (14), reels (11, 12) for winding a magnetic tape (16) thereon and a drive portion for driving the reels; a drive control unit (2, 20, 21) for controlling the drive unit; and a prefetch control unit (3) having a first memory for prefetching a plurality of commands from the host controller and a second memory for temporarily storing data from the host controller or data read out from the magnetic tape. The drive unit is operated through the drive control unit according to the commands stored in the first memory and the results of the operation are reported to the host controller. The prefetch control unit counts the number of blocks of write data of the write commands, and when the counted block number is within a free area of the second memory and is larger than a maximum block length (MALX) allowing prefetching in the second memory, the counted block number is set as the renewed maximum block length and prefetch control of the write data is executed based on the renewed maximum block length. When the drive control unit detects that the magnetic tape has arrived at the vicinity of the end thereof, the nunber (AN) of storable the write commands to be prefetched and stored in the first memory are reduced by the prefetch control unit.

4 Claims, 15 Drawing Sheets

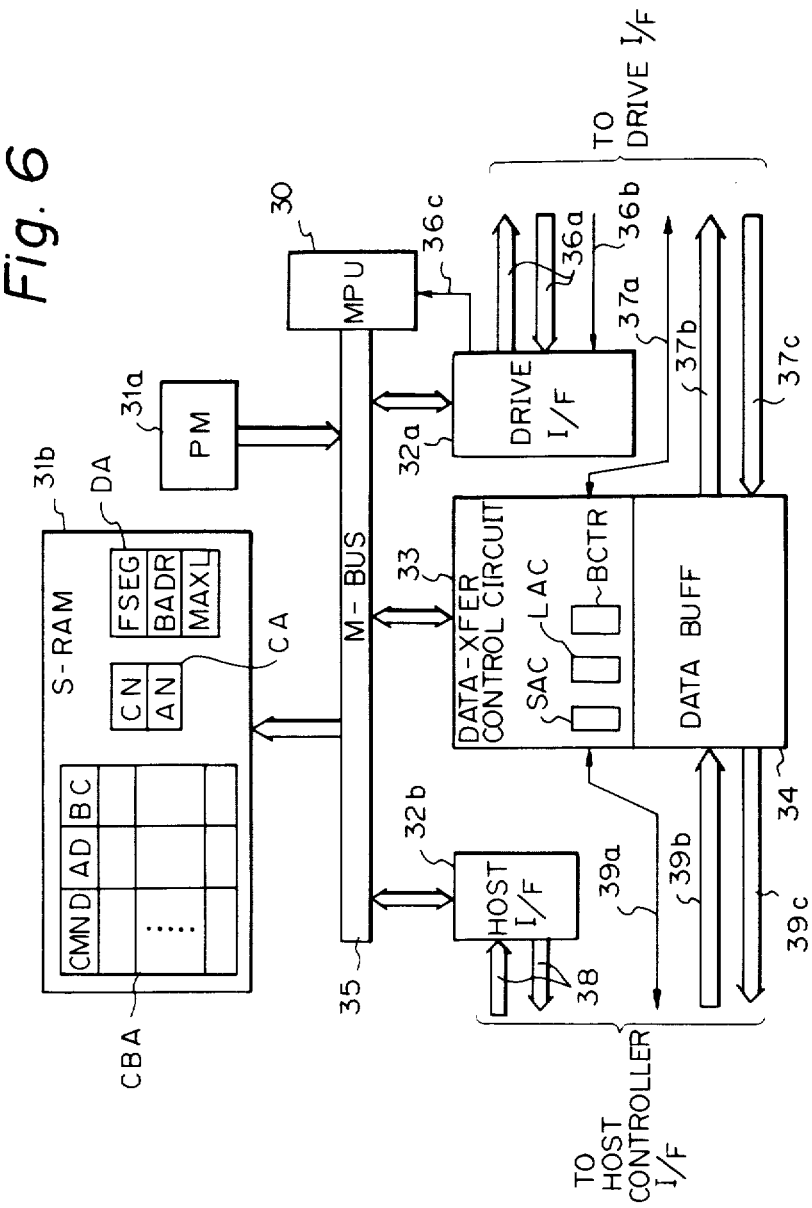

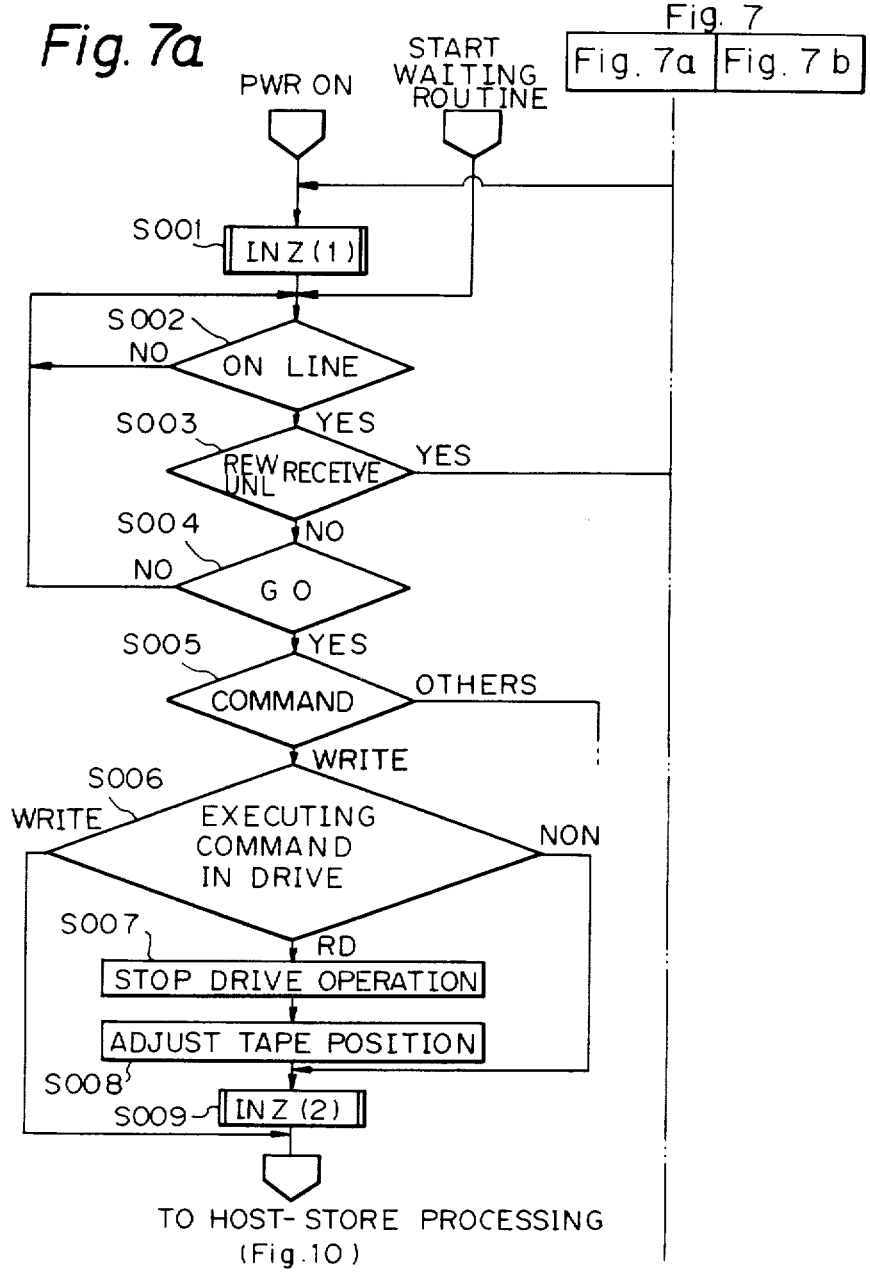

MAGNETIC TAPE PREFETCH CONTROL SYSTEM DYNAMICALLY VARYING THE SIZE OF THE PREFETCHED BLOCK

BACKGROUND OF THE INVENTION

1. Field of the Invention

The present invention relates to a magnetic tape system. More particularly, the present invention relates to a magnetic tape system including a buffer memory in which a plurality of commands and data can be stored and prefetch control means in which data from a host system can be prefetched into the buffer memory.

2. Description of the Related Art

A magnetic tape system is extensively used as an external memory unit of a computer and, recently, the magnetic tape system is especially used as a backup system for an external memory unit such as a magnetic disk unit. At present, a prefetch control unit is disposed in this magnetic tape system. The prefetch control unit includes a command buffer memory for temporarily storing a plurality of commands from a host system and a data buffer memory for temporarily storing data from the host system to be stored or data read out. Accordingly, if commands of the host system are received in the memory of the prefetch control unit, the host system can conduct subsequent processing or can continue to generate magnetic tape access commands before termination of access in the drive unit, while the drive unit can perform processing before receipt of commands from the host system or confirmation thereof. Therefore, by introduction of the prefetch control unit, the entire processing capacity of the magnetic tape system can be improved.

Since the capacity of the command buffer memory or data buffer memory is limited, if many commands from the host system must be received, prefetching must be restricted.

In the conventional prefetch control, the restriction of prefetching is defined by consecutive steps such as 8 KB, 16 KB, 32 KB, and 64 KB. If the value of the restriction is 8 KB, the command buffer memory is occupied by 8 KB for a prefetch request smaller than 8 KB. When the value of the restriction is 32 KB, the prefetch request for 8 KB may be accepted, however, it is deemed that 32 KB of the command buffer memory is used for the prefetch request for 8 KB, resulting in a low availability of the command buffer memory. Generally, a small amount of restriction may provide more opportunities of acceptance of the prefetch. But, a small restriction must be changed to a large restriction when the prefetch request for a large amount of data is required.

In the conventional prefetch control, however, the restriction is effected by exchanging values predetermined stepwise in relation to one another, and every time exchange is performed, an error report is transmitted to the host system. Accordingly, error reports are often transmitted, and the host system is withheld for a certain time from transmitting data and commands to the prefetch control unit. For this reason, the conventional prefetch control is defective in that the inherent function of the prefetch control unit is not sufficiently utilized. Moreover, although prefetching must be stopped at the end of the magnetic tape, a satisfactory measure for effecting this stop has not been developed.

These problems will be described hereinafter with reference to the accompanying drawings.

SUMMARY OF THE INVENTION

A primary object of the present invention is to provide a magnetic tape system with prefetch control means, in which the method for setting the maximum block length is improved to reduce the frequency of transfer retry and thus shorten the waiting time.

In accordance with the present invention, there is provided a magnetic tape system comprising a drive unit including a magnetic head, reels for winding a magnetic tape thereon and a drive portion for driving the reels, a drive control unit operatively connected to the drive unit to control the drive unit, and a prefetch control unit, operatively connected to a host controller, for feeding commands for access to the drive control unit and the magnetic tape and having a first memory for prefetching a plurality of commands from the host contoller, and a second memory for temporarily storing store data from the host controller or data read out from the magnetic tape, the drive unit being operated through the drive control unit according to the commands stored in the first memory and results of the operation being reported to the host controller. The prefetch control unit counts the number of bytes of write data of the write command, and when the counted block number is within a free area of the second memory and is larger than the maximum block length allowing prefetching in the second memory, the counted block number is set as the renewed maximum block length, and prefetch control of the write data is executed based on the renewed maximum block length.

In accordance with a preferred embodiment, when the drive control unit detects that the magnetic tape has arrived in the vicinity of the end thereof, the number of storable write commands to be prefetched and stored in the first memory can be reduced by the fetch control unit.

BRIEF DESCRIPTION OF THE DRAWINGS

Other objects and features of the present invention will become apparent from the following detailed description made with reference to the accompanying drawings, in which:

FIG. 6 is a diagram illustrating the structure of the main part of the embodiment shown in FIG. 5;

FIG. 7 comprising FIGS. 7a and 7b is a flow chart showing the starting processing in one embodiment of the present invention;

FIGS. 10a and 10b is a diagram illustrating the processing of store commands to a host system in one embodiment of the present invention;

DESCRIPTION OF THE PREFERRED EMBODIMENTS

Figure 1:
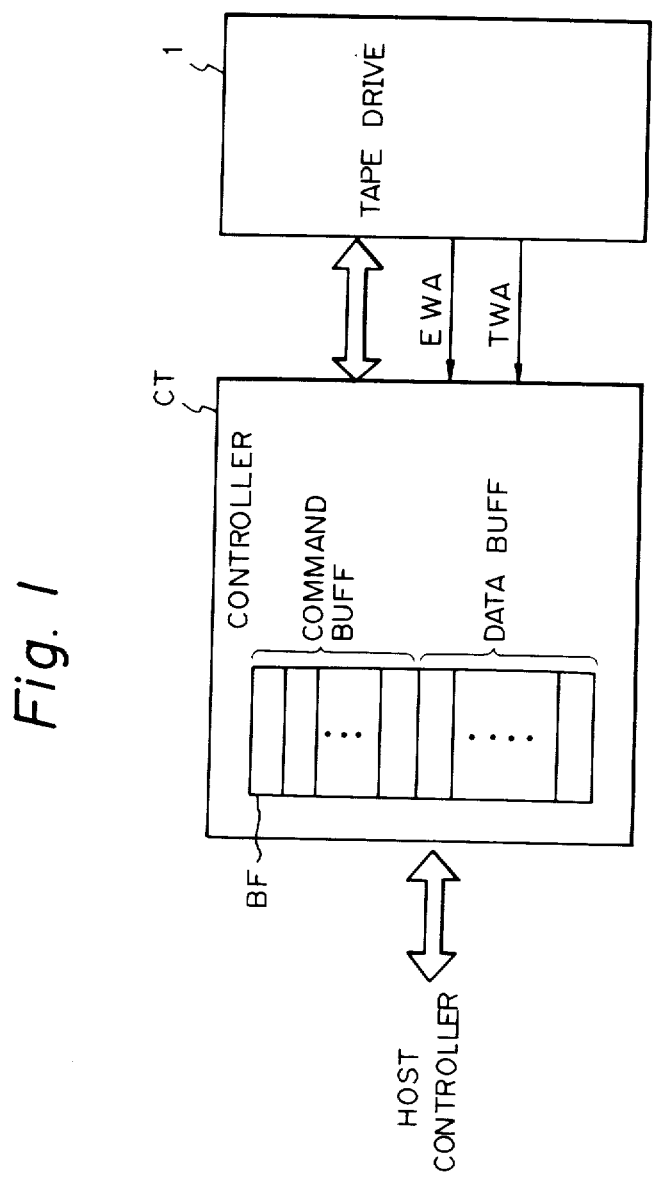
FIG. 1 is a diagram illustrating the prefetch control in the magnetic tape system.

Before describing the preferred embodiments of the present invention, the concept of the fetch control will be described with reference to FIG. 1.

Generally, the magnetic tape system includes a tape drive unit 1 including a magnetic head for effecting the writing and reading of data for a magnetic tape, a magnetic tape drive portion for travelling and driving the magnetic tape, and a control unit CT for controlling the tape drive unit 1 according to a host controller (host system). Recently, a prefetch control unit having a buffer memory BF has been disposed in this control unit CT to prefetch commands and data from the host controller and temporarily store them in the buffer memory BF, and the prefetch control unit performs the prefetch control of commands and data for executing the commands and data in the buffer memory BF to the tape drive unit 1.

This magnetic tape system is known as "a magnetic tape system with a buffer memory", and according to a command from the host controller, the tape drive unit 1 is actuated asynchronously. Accordingly, the host controller need not wait for termination of the operation of the tape drive unit 1 for one command but can issue commands successively to the magnetic tape system. Furthermore, the tape drive unit 1 can execute the operation continuously without waiting for a command from the host controller. Accordingly, the processing efficiency can be improved and the operation efficiency at the streaming mode can be especially improved.

The conventional technique and the problems thereof will now be described.

In order to prefetch commands and temporarily store them in the above-mentioned buffer memory BF, this buffer memory BF includes a command buffer memory capable of storing a plurality of commands therein and a data buffer memory capable of storing a plurality of data therein. For example, 64 commands at the maximum are stored in the command buffer memory and 256 KB of data at the maximum are stored in the data buffer memory, whereby the number of prefetch commands and data is increased.

The data transmitting operation of this magnetic tape system with the buffer memory will now be described with reference to FIGS. 2a through 2j.

Figure 2:
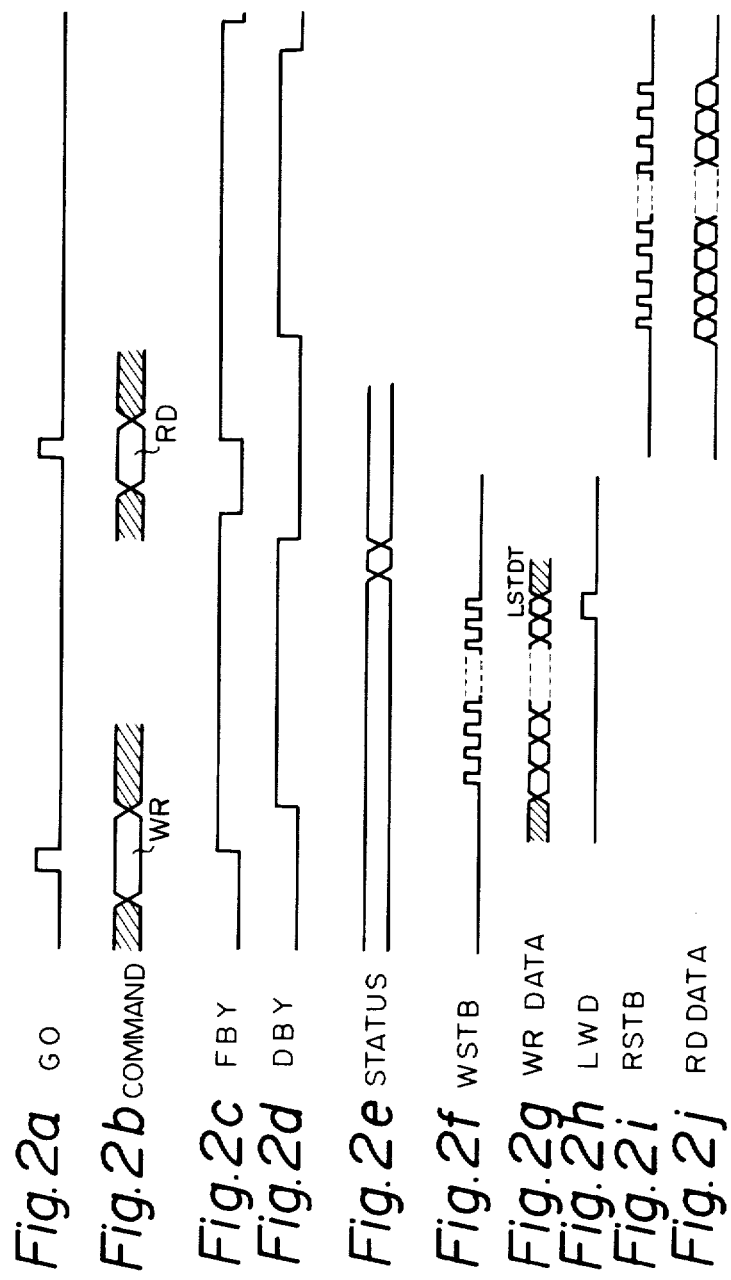
FIGS. 2a through 2j are diagrams illustrating the conventional technique.

When a start signal G0 and a command signal are given from the host controller (FIGS. 2a and 2b), the control unit CT transmits a response signal FBY (format busy) to the host controller (FIG. 2c) and sends a data busy signal DBY indicating the execution of the command to the host controller (FIG. 2d). If the command signal is a signal of a command concerning a write operation, a write command in the specification, which involves an ordinary write command with write data given by the host controller and other write commands, such as erase, space without write data given by the host controller and which write data is generated at the magnetic tape system, a write strobe pulse WSTB is sent to the host controller from the control unit CT (FIG. 2f), stored data is transferred from the host controller to the control unit CT synchronously with the write strobe pulse WSTB (FIG. 2f), and this data is stored in succession in the data buffer memory. The host controller transmits a last word signal LWD to the control unit CT simultaneously with final write data LWRDT included in the stored data (FIG. 2h). The control unit CT detects this last word signal LWD, stops feeding the write strobe pulse WSTB (FIG. 2f) to terminate the transfer of data. The control unit CT sends a status signal STATUS indicating the normality/abnormality of the receiving operation to the host controller (FIG. 2e) and stops feeding the data busy signal DBY (FIG. 2d) to terminate the operation of transfer of write data. Note, received commands are stored in the command buffer memory.

On the other hand, where the command is a read command, data read out from the tape drive 1 (RD DATA) is transferred to the host controller together with a read strobe pulse RSTB (FIGS. 2i and 2j). Termination of the transfer of read data is reported to the host controller to stop feeding the data busy signal DBY.

For receiving write data incidental to commands concerning the write operation, the storage capacity of the data buffer memory should be taken into consideration.

More specifically, a maximum receipt data block length is set, and if the free segment number FSEG of the data buffer memory is larger than the maximum receipt data block length MAXL (hereinafter referred to as "maximum block length"), transfer of data from the host controller is allowed (that is, the data busy signal DBY is output), and if the free segment number FSEG is smaller than the maximum block length MAXL, transfer of data is not allowed and transfer of data from the host controller as the host system is withheld until a free segment is produced in the data buffer memory by the write operation of the tape drive unit 1. Note, the unit of each of FSEG and MAXL is expressed by kilobytes (KB).

Figure 3:
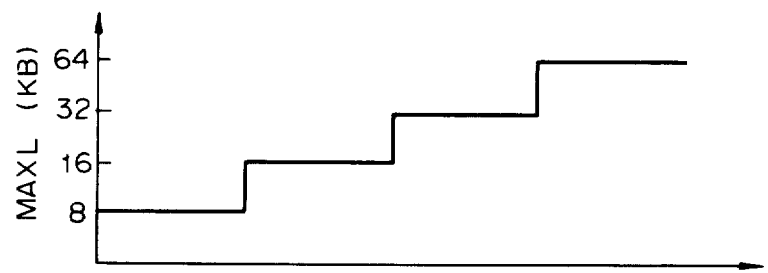

If the maximum block length is set at one value, a transfer of write data exceeding this value is impossible. Accordingly, in the conventional technique, as shown in FIG. 3, for example, four values of 8 KB, 16 KB, 32 KB, and 64 KB are set for the maximum length, and where the free segments of the data buffer memory are in the state allowing a transfer of data exceeding the set value of 8 KB and data of 10 KB is actually transferred, the set value is stepped up to 16 kilobytes and the transferred data of 10 KB is received again.

In the conventional technique, however, where the receipt block length exceeds the set value of the maximum block length MAXL, it is necessary to change the set value of the maximum block length and then receive the data again. Accordingly, even if the free segment number FSEG of the data buffer memory is larger than the receipt block length, an error is reported to the host controller and re-transfer is performed.

Since the set value is stepwise increased, if the set value is, for example, 8 KB, and the receipt block length is 64 KB, an error is first reported to the host controller at the set value of 8 KB and re-transfer is effected, and then an error is reported to the host controller at the set value of 16 KB and re-transfer is effected. Further, an error is reported to the host controller at the set value of 32 KB and re-transfer is effected, and finally, normal receipt is effected at the set value of 64 KB. Namely, a transfer retry must be carried out three times.

Moreover, since the set value is preliminarily determined, when the set value is, for example, 16 KB and the receipt block length is 10 KB, even if the free segments of the data buffer memory are 10 KB, transfer cannot be initiated until another 6 KB become free. This is one cause of the reduction of the efficiency of the prefetch control.

Figure 4:
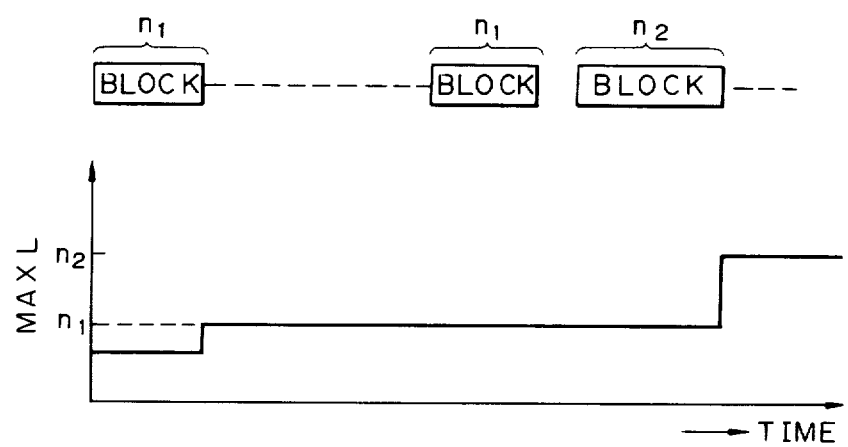
FIG. 4 is a diagram illustrating the principle of the present invention.

The principle of the present invention for solving the above-mentioned problems will now be described with reference to FIG. 4.

In the present invention, the maximum block length is renewed according to the practical data block length of the write command so long as the actual data block length is within the free sements of the data buffer memory. More specifically, if the block length is n1, the maximum block length is set at n1, and if a data block having a receipt block length n2 exceeding n1 is then received, the set value of the maximum block length is directly renewed to n2.

The characteristic of the present invention is different to the conventional technique, in which the set value of the maximum block length is determined irrespective of the actually received block length, since according to the present invention, the maximum block length is renewed according to the actually received block length, and if the free segments of the buffer memory are larger than the receipt block length, a transfer of data is possible. Accordingly, the retry frequency is reduced and the waiting time is shortened. Furthermore, where the maximum block length is, for example, 10 KB and the receipt block length is 64 KB, even when the free segment of the data buffer memory is smaller than 64 KB, a normal transfer is made possible by one retry, and the retry frequency is thus reduced.

Embodiments of the present invention will now be described.

Figure 5:
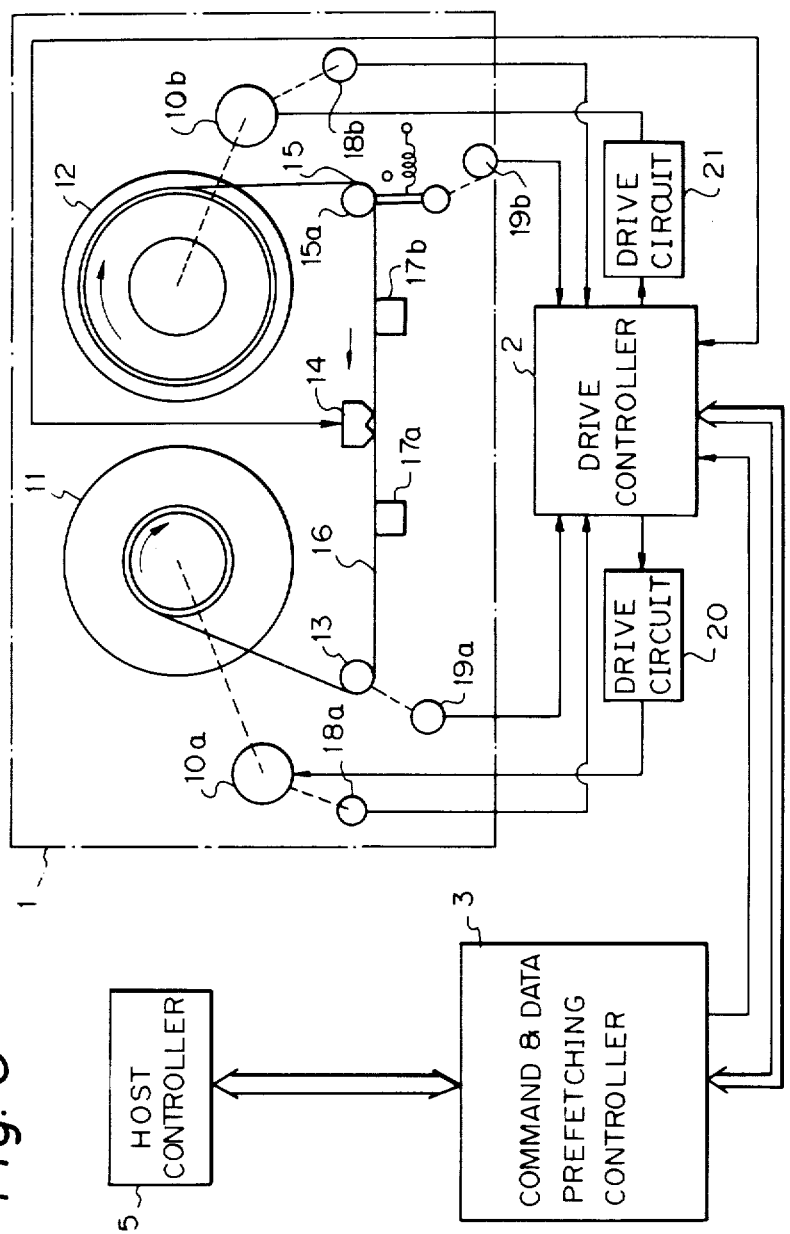
FIG. 5 is a diagram illustrating the entire structure of one embodiment of the present invention.

FIG. 5 is a diagram of the structure of a magnetic tape system according to one embodiment of the present invention.

Reference numeral 1 represents a magnetic tape drive unit (hereinafter referred to as "drive") of a direct reel-to-reel drive system, which is constructed so that a magnetic tape 16 is travelled between a take-up reel (machine reel) 11 and a feed reel (file reel) 12, and is wound on the take-up reel 11 through a roller 15a of a tension arm 15, a magnetic head 14, and an idler 13. The magnetic tape 16 is guided by guides 17a and 17b on both sides of the magnetic head 14. The take-up reel 11 and the feed reel 12 are rotated and driven by drive motors 10a and 10b, respectively. Rotary encoders 18a and 18b are mounted on the drive motors 10a and 10b, respectively, to detect the number of rotations of the drive motors 10a and 10b. A rotary encoder 19a is mounted on the idler 13 to make it possible to determine the actual travelling position of the tape, and a tension detector 19b is mounted on the tension arm 15 to enable detection of the tape tension.

Reference numeral 2 represents a drive controller for driving and travelling the tape and driving the head for writing or reading according to commands and data transmitted from a command and data controller described hereinafter. The drive controller 2 receives outputs from the respective rotary encoders 18a, 18b, and 19a to determine the state of travel of the type, and receives the output from the tension detector 19b to check the tension of the tape. Furthermore, the drive controller 2 controls both drive motors 10a and 10b through drive circuits 20 and 21. Thus, the drive controller 2 drives and travels the tape under a constant tape tension, transmits data to be written to the magnetic head 14 to effect writing, and receives data read by the magnetic head 14.

Reference numeral 3 represents a command and data prefetch controller which receives write commands or read commands from the host controller and accumulates written data therein. In the case of a write command, the command and data prefetch controller 3 transmits a write command together with data to be stored to the drive controller 2 to effect the writing operation, and if the operation is normally terminated, the command and data prefetch controller 3 informs the host controller of this normal termination. If the operation is not normally terminated, the command and data prefetch controller 3 causes the drive controller 2 to effect the write retry operation.

The command and data prefetch controller 3 has a command buffer memory and a data buffer memory, described later, and operates as a magnetic tape system to the host controller and as a host controller to the drive control unit 2.

FIG. 6 is a diagram illustrating the command and data prefetch controller 3 in the system shown in FIG. 5.

In FIG. 6, reference numeral 30 represents a microprocessor (hereinafter referred to as "MPU"), which performs control of the receipt of commands and data from the host controller and control of the transmission of data and status according to a microprogram of a program memory, and also performs control of the transmission of commands and data to the drive controller 2 and control of the receipt of data and status from the drive controller 2. Moreover, the microprocessor 30 performs the processing of a retry control. Reference numeral 31a represents a program memory in which programs to be executed by the MPU 30 are stored. Reference numeral 31b represents a random access memory (hereinafter referred to as "RAM"), in which data, commands, and parameters necessary for the MPU 30 processing are stored. In this embodiment, the RAM 31b has a command buffer area CBA, a command buffer management area CA, and a data buffer management area DA.

The command CMND from the host controller, the address AD of data transferred by this command in the data buffer memory, and the byte count number BC are stored in the command buffer area CBA, and the command store number CN of commands stored in the command buffer area CBA but not executed and the command store area number (available command number) AN of the write commands which can be stored in the command buffer area CBA, are stored in the command buffer management area CA. The free segment numbr FSEG of the buffer memory showing the free segments of the data buffer memory by the unit number (kilobyte unit), the buffer address BADR showing the lead address of the data buffer memory at the time of transfer of data for storing in the data buffer memory, and the maximum block length MAXL showing the maximum length of the data block to be processed are stored in the data buffer management area DA. Reference numeral 32a represents a drive interface circuit for the transfer of control signals and the like between the drive controller 2 and the command and data prefetch controller 3. Reference numeral 32b represents a host interface circuit for the transfer of control signals and the like between the host controller and the command and data controller 3. Reference numeral 33 represents a data transfer control circuit for controlling a data buffer, described hereinafter, to control the transfer of data between the host controller or the drive controller 2 and the command and data controller 3. The control circuit 33 transmits a data transfer demand signal to the host controller and receives a data transfer demand signal from the drive controller 2 to execute control of the data transfer. The control circuit 33 includes a store address counter SAC for storing the data into the data buffer memory, a load address counter LAC for loading the data from the data buffer memory, and a byte counter BC.

Reference numeral 34 represents a data buffer controlled by the data transfer control circuit 33. The data buffer 34 stores the data to be written from the host controller and transfers the written data to the drive controller 2. The buffer 34 also stores the data read from the drive controller 2 and transfers the read data to the host controller. The data buffer 34 has, for example, a capacity of 256 KB. Reference numeral 35 represents a data bus for connecting the MPU 30 to the program memory 31a, RAM 31b, drive interface circuit 32a, host interface circuit 32b, and data transfer control circuit 33 to execute the transfer of commands and data.

Reference numeral 36a represents a control signal line used to transmit commands to the drive controller 2 and receive status and the like from the drive controller 2. Reference numeral 36b represents a line for a signal showing a detection of a region adjacent to the tape end, which is used for transmitting this signal from the drive controller 2. Reference numeral 36c represents an interruption line which is used for informing the MPU 30 of an interruption from the drive interface circuit 32a. Reference numeral 37a represents a data transfer demand signal line for transmitting a data transfer demand signal to the data transfer control circuit 33 from the drive controller 2. Reference numeral 37b represents a store data bus used for transmitting the stored data to the drive controller 2 from the data buffer 34. Reference numeral 37c represents a read data bus used for transmitting the read data to the data buffer 34 from the drive controller 2. Reference numeral 38 represents a control signal line used for the transfer of commands and status between the host controller and the command and data controller 3. Reference numeral 39a represents a data transfer control signal line used for transmitting a data transfer demand signal to the host controller. Reference numeral 39b represents a store data bus used for transmitting the stored data from the host controller to the data buffer 34. Reference numeral 39c represents a read data bus used for transmitting the read data to the host controller from the data buffer 34.

Accordingly, the MPU 30 executes writing and reading among RAM 31b, the host interface circuit 32b, the drive interface circuit 32a, and the data transfer control circuit 33 through the data bus 35 to perform the desired processing. More specifically, the host interface circuit 32b performs the transfer of commands and status by the control of the MPU 30 through the host controller and the control signal line 38, and the drive interface circuit 32a performs the transfer of commands and status by the control of the MPU 30 through the drive controller 2 and the control signal line 36a. According to the instructions from the MPU 30, the data transfer control circuit 33 transmits a data transfer demand to the host controller through the data transfer demand signal line 39a, and on receipt of this signal, the host controller transmits the stored data to the data buffer 34 through the store data bus 39b and the stored data is accumulated in the data buffer 34. The data transfer demand transmitted through the data transfer demand signal line 37a from the drive controller 2 causes the data transfer control circuit 33 to transmit the stored data of the data buffer 34 to the drive controller 2 through the stored data bus 37b.

Furthermore, the instructions from the MPU 30 cause the data transfer control circuit 33 to accumulate the read data transmitted from the drive controller 2 through the read data bus 37c in the data buffer 34 and to transmit the read data of the data buffer 34 to the host controller through the read data bus 39c.

Note, the drive control unit 2 detects the vicinity of the terminal region of the tape by inspection of the running position by the rotary encoder 19a and transmits an early warning area EWA signal to the signal line 36, and the drive control unit 2 detects an end of tape EOT signal and emits a tape warning area TWA signal to the signal line 36a.

Figure 7B:
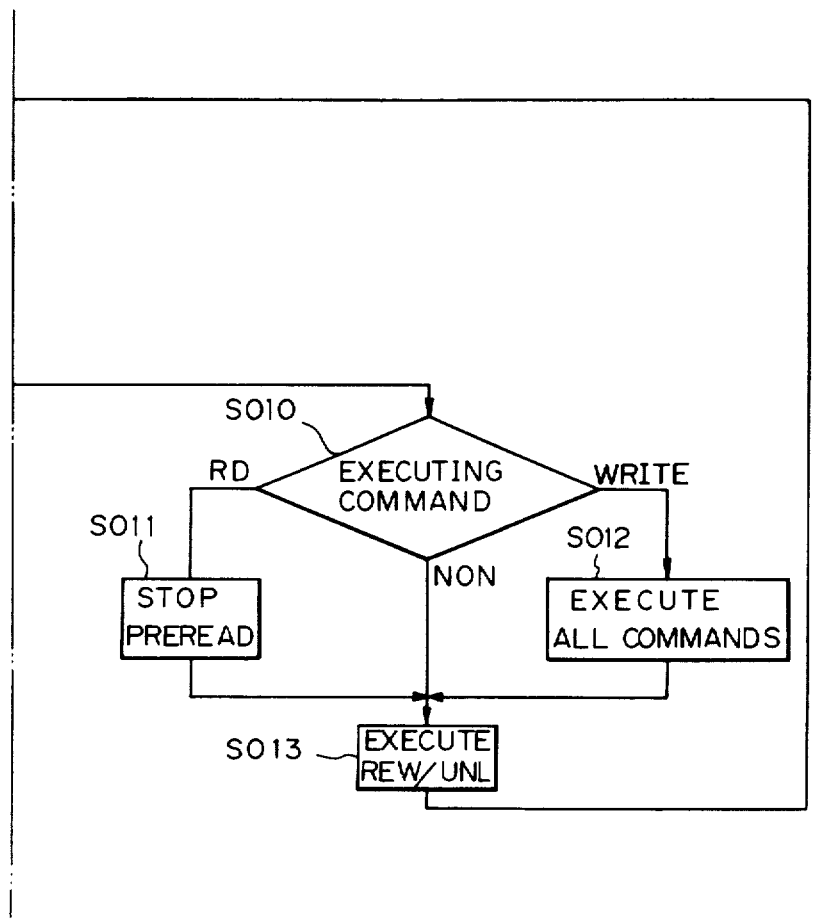
Figure 8:
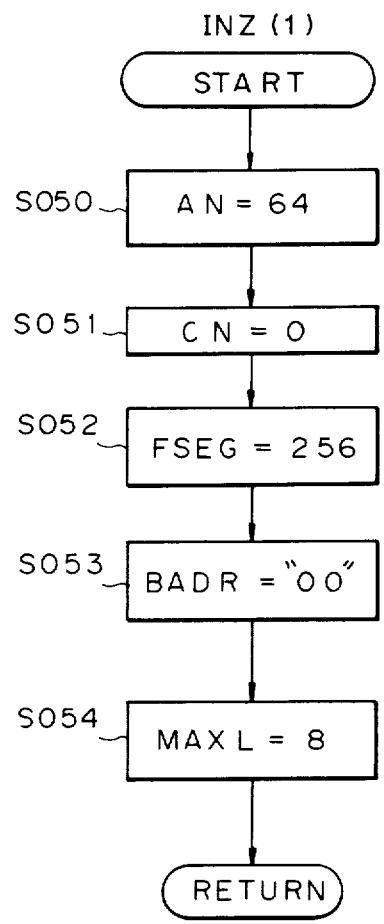
FIGS. 8 and 9 are flow charts illustrating the initial setting processing in the embodiment shown in FIG. 7.
Figure 9:
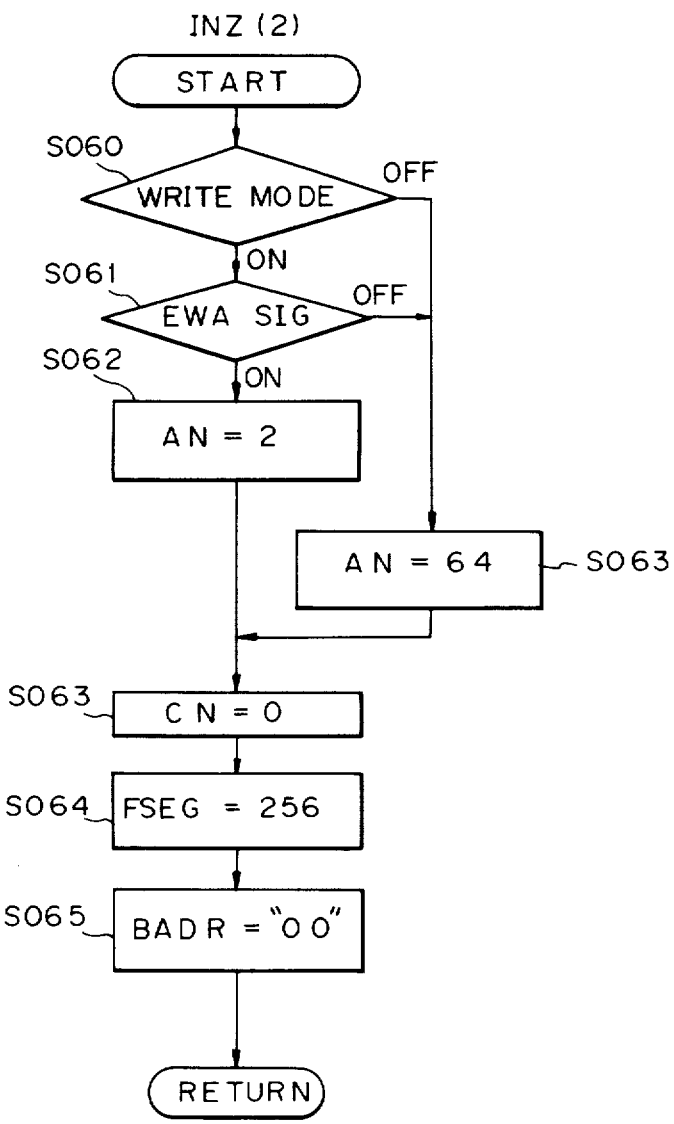

FIG. 7 is a flow diagram illustrating the starting process in one embodiment of the present invention, and FIGS. 8 and 9 are flow charts illustrating the initial setting process in the embodiment shown in FIG. 7.

Step S001

When the power is supplied, the initial setting processing (1) (INZ(1)) shown in FIG. 8 is performed.

Steps S050 through S054

MPU 30 sets the command store area number AN of the command buffer control area CA of the RAM 31 at a maximum value of 64 (S050). Then, the MPU 30 clears the command store number CN of the command buffer control area CA to zero (S051) and sets the buffer segment (data buffer memory) of the data buffer control area DA at a maximum value of 256, and the MPU 30 sets the data buffer address at "00" ("XX" represents a hexadecimal number) (S053). Furthermore, the MPU 30 sets the maximum block length MAXL of the data buffer control area CA to a minimum value of 8 KB (S054). Thus, the initial setting process (1) is terminated.

Steps S002 and S003

After the termination of the initial setting by the power supply or while waiting for the starting signal from the host controller, the MPU 30 determines if the on-line state is attained where the magnetic tape is set on the feed reel 12, through the drive interface circuit 32a via the bus 35 (S002).

If the on-line state is detected, the MPU 30 examines the register content of the host interface circuit 32b through the bus 35 and determines whether or not a rewind command REW or an unload command UNL has arrived from the host controller (S003).

Steps S010 through S013

If the command REW or UNL arrives, the MPU 30 determines whether the execution processing mode of the drive control unit 2 concerns the read command or the write command or whether the processing is not being executed (S010). If the execution processing mode concerns the read command, the drive processing (prefetching) is stopped (S011). Namely, if the drive control unit 2 terminates the process being executed, the drive control unit 2 is instructed from the control line 36a through the drive interface circuit 32a not to issue a command for new processing, and the processing concerning the read command is terminated.

On the other hand, if the execution processing mode concerns the write command, all the commands in the command buffer memory CBA are executed (S012). After execution of all the commands, or if there is no processing being executed, or after the drive processing has been stopped, the MPU 30 gives the command REW (return tape to BOT) or the command UNL (wind tape) through the drive interface circuit 32a and causes the drive unit 1 to execute this action (S013), and the routine returns to the step S001.

Step S004

On the other hand, if the command REW or UNL does not arrive, to MPU 30 checks the register content of the host interface circuit 32b through the bus 35 and determines whether or not the starting signal (GO) from the host controller is present. If there is no starting signal, the starting signal must be awaited and the routine returns to the step S002.

Step S005

If the starting signal is received from the host controller, namely, if receipt of the GO signal is detected, the MPU 30 checks the register content of the host interface circuit 32b through the bus 35 and determines what is the given command (S005).

If the given command does not concern the write but concerns the read, the processing routine is executed.

Steps S006 through S009

On the other hand, if the given command concerns the write, the MPU 30 determines whether the execution processing mode of the drive control unit 2 concerns the read processing or the write processing, or whether the processing is not being executed (S006). If the execution processing mode concerns the read command, the drive processing is stopped (S007). More specifically, if the processing being executed by the drive control unit 2 is terminated, the drive control unit 2 stops the processing of the read command from the control line 36a through the drive interface circuit 32a and is instructed not to issue a new processing command. Then, in order to adjust the tape position, a command (spacing or backspacing) for the adjustment of the tape position is given to the drive control unit 2 through the drive interface circuit 32a (S008). After termination of this step, or if the processing of the drive control unit 2 is not being executed, the initial setting processing (2) shown in FIG. 9 is performed.

Steps S060 through S065

First, the MPU 30 determines whether or not the execution processing mode is the write mode (S060), and if the mode is not the write mode, the command store area number AN of the command buffer control area CA of the RAM 31 is set at a maximum value of 64 (S063). If the mode is the write mode, a check is made through the drive interface circuit 32a of whether the early warning area signal EWA (signal for the area near the end of the tape) is ON or OFF. If the signal EWA is OFF (the tape is not at the area near the end), the command store area number AN of the command buffer control area of RAM 31 is set at a maximum number 64, as in the above-mentioned case.

If the signal EWA is ON, the command store area number AN is set at a minimum number of 2.

Then, the MPU 30 clears the command store number CN of the command buffer control area CA to zero (S063)), sets the buffer memory segment (data buffer memory) of the data buffer control area DA at a maximum value of 256 (S064), and sets the data buffer address at "00" (S065), whereby the initial setting processing (2) is terminated.

Figure 10:
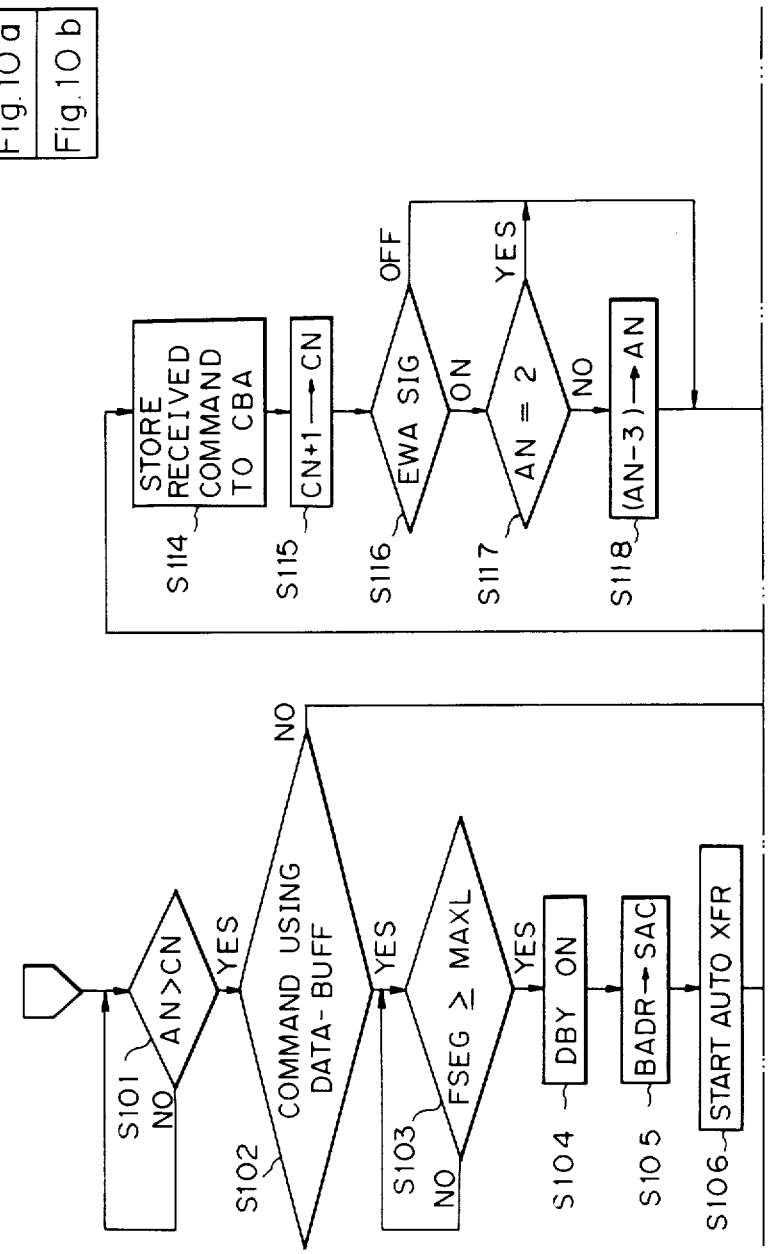
FIG. 10 comprising

Then, the routine goes to the routine of the processing of the write commands to the host controller, shown in FIG. 10.

On the other hand, if the execution processing mode concerns the write command to the step S006, the routine goes to the store processing routine to the host controller immediately.

Accordingly, if the starting signal from the host controller is a write command, even during the read processing, the processing is changed to the write processing and the write processing is continued.

At the initial setting processing (1), the maximum block length MAXL is set at a minimum values of 8 KB, and at the initial setting processing (1) or (2), the data buffer memory segment is set at a maximum value of 256 KB and the command store area number AN is set at a maximum value of 64 KB.

Figure 11:
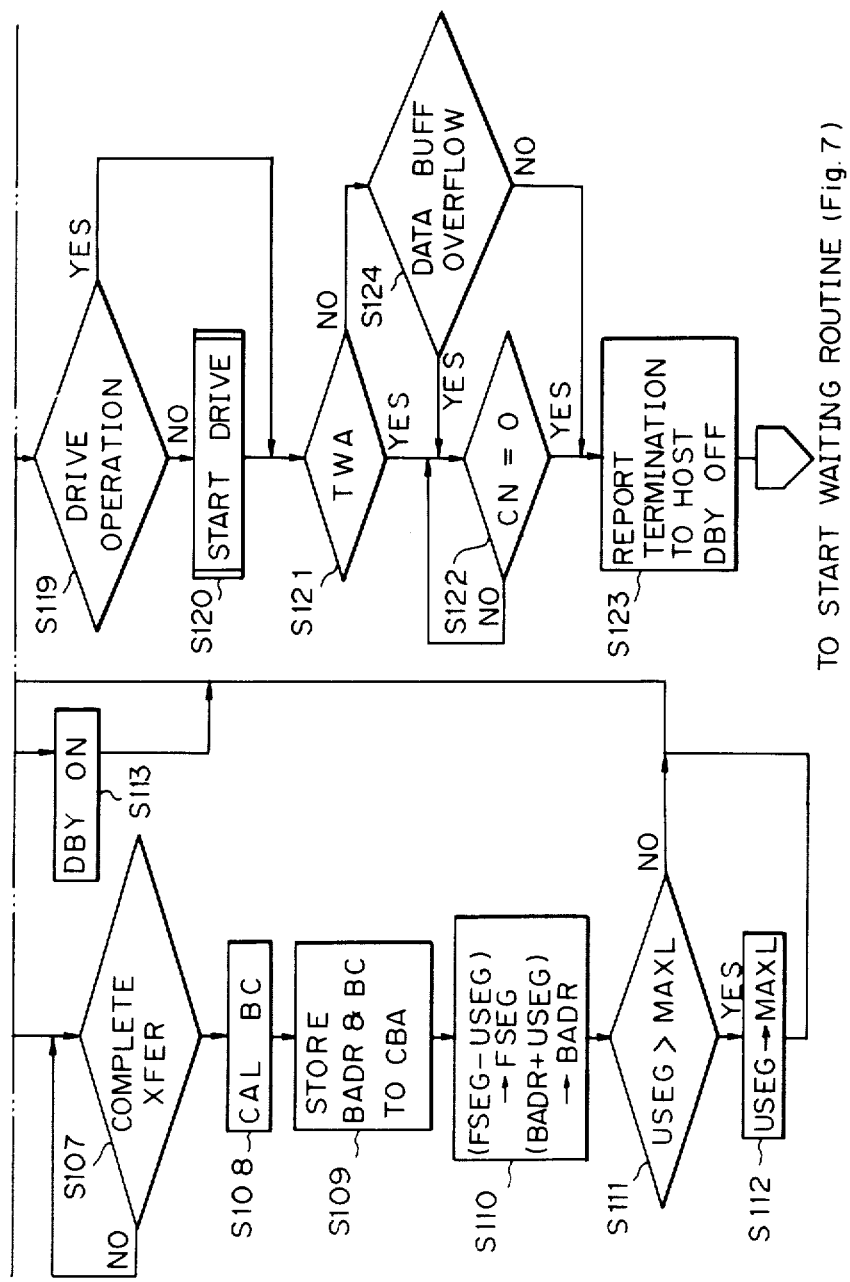
FIGS. 11a through 11e, 12 and 13 are diagrams illustrating the prefetching of commands and data in one embodiment of the present invention.
Figure 12:
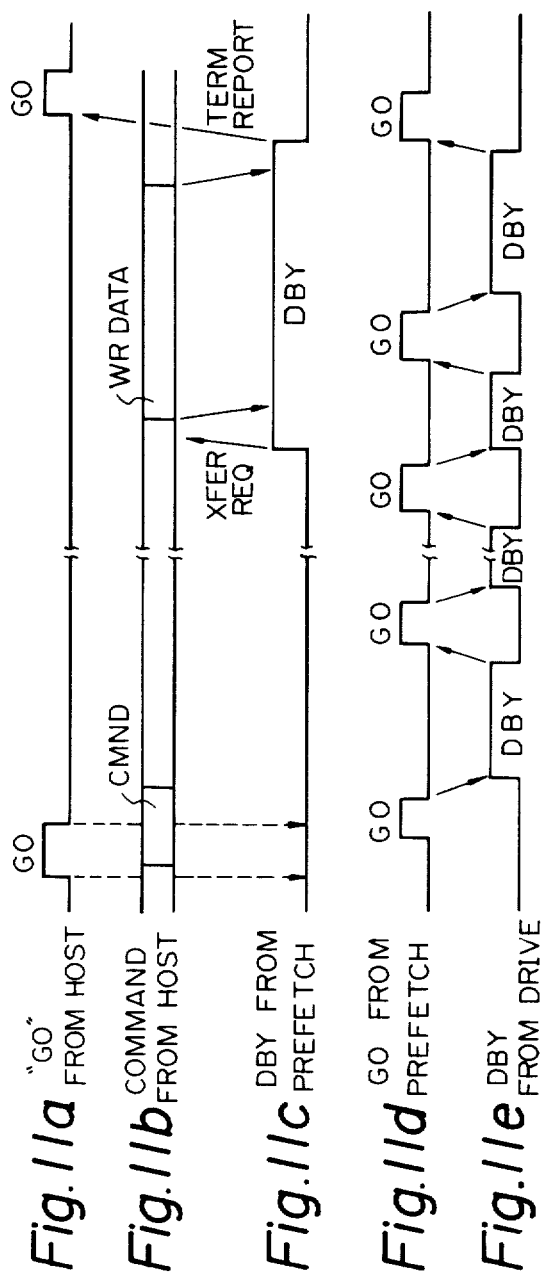
Figure 13:
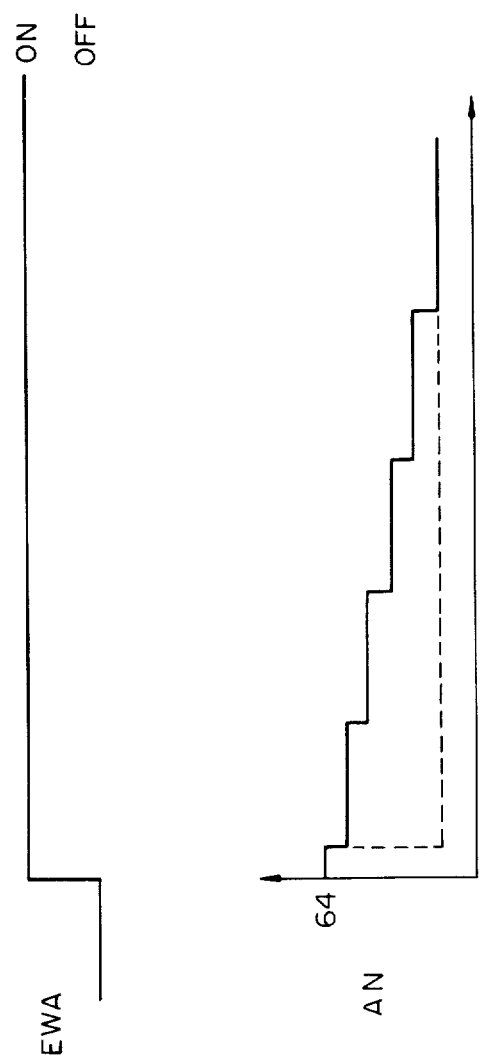

FIG. 10 is a flow chart illustrating the write processing to the host controller and FIGS. 11 through 13 are flow charts illustrating the prefetching of write data.

Step S101

If the MPU 30 is started by the write command from the host controller in FIG. 7, the MPU 30 reads out the command store number CN of the command buffer control area CA of the RAM 31b and the command store area number AN through the bus 35 and compares these numbers. Where AN≦CN, that is, if the number of write commands, stored in the command buffer memory CBA, is larger than the storable command number AN, storing of the write commands in the command buffer memory CBA is withheld.

Step S102

Where AN>CN, since the write commands can be stored in the command buffer memory CBA, the MPU 30 checks whether or not the pertinent write command is to use the data buffer memory 34 (S102). If data of the magnetic tape system, such as erase, write, or tape mark, is generated and no data is generated from the host controller, since the data buffer memory 34 is not used, the data busy signal DBY is made ON (S113) and the routine goes to the command write step S114.

When the starting signal (GO) and command are given from the host controller (master to the prefetch control unit), as shown in FIGS. 2a through 2j, if the command is executable, the prefetch control unit 3 (slave to the host controller) turns ON a data busy signal DBY showing this state and returns the signal to the host controller. This relation is similarly established also where the prefetch control unit is a master unit and the drive control unit 2 is a slave unit.

Steps S103 and S104

If the write command is an ordinary write command, which uses the data buffer memory 34, the MPU 30 decides that an automatic transfer to the data buffer memory 34 is allowable. First, the MPU 30 reads out the free buffer segment (parameter data buffer memory) of the data buffer control area DA of the RAM 31b and the maximum block length MAXL and determines whether or not the free buffer segment number FSEG is larger than the maximum block length (S013). If the free buffer segment number FSEG is smaller than the maximum block length, the receipt of write data is withheld until the free buffer segments of the data buffer 34 become equal to the maximum block length. If the buffer segment number FSEG is larger than the maximum block length MAXL, transfer is allowed. Accordingly, the above-mentioned data busy signal DBY is made ON (S104), and the allowance of transfer is reported to the host controller.

Steps S105 through S108

Then, the MPU 30 reads out the start buffer address BADR of the data buffer control area DA of the RAM 31b and sets it at the store address counter SAC of the data transfer control circuit 33 (S105), and the MPU 30 starts the data transfer control circuit 33, whereby the data transfer control circuit 33 issues a data transfer demand to the host controller from the data transfer control signal line 39a.

Accordingly, the host controller transfers the write data to the data buffer memory 34 through the store data bus 39b, and the write data is accumulated in the data buffer memory 34 according to the address of the store address counter SAC of the data transfer control circuit 33. The store address counter SAC counts up every time one byte of write data is transferred.

When the data transfer control circuit 33 decides that the data transfer has terminated (S107), the MPU 30 reads out the store address counter SAC of the data transfer control circuit 33 and calculates the difference from the buffer address of the data buffer control area DA to determine the byte number BC of the transferred write data (S108).

Steps 109 and 110

The MPU 30 renews the data buffer memory CBA of the RAM 31b and the data buffer control area DA.

First, the buffer address BADR (start address of store data) of the data buffer control area DA of RAM 31b and the byte number of the write data calculated at the step 108 are stored in the pertinent command column of the command buffer memory CBA of the RAM 31b (S109). Then, the use segment number USEG is subtracted from the free segment number FSEG of the data buffer control area DA of the RAM 31b to renew the free segment number FSEG, and the use segment number USEG is added to the buffer address BADR to renew the start address of the buffer address BADR.

Steps S111 and S112

The MPU 30 compares the above-mentioned use segment (receipt block length) with the maximum block length MAXL of the data buffer control area DA of RAM 31b (S111).

If it is found by this comparison that the use segment number USEG is larger than the maximum block length MAXL, the maximum block length MAXL of the data buffer control area DA is renewed to this use segment number USEG (S112), and the routine goes to step S114.

In contrast, if the use segment number USEG is smaller than the maximum block length MAXL, renewal is not executed and the routine goes to step S112.

Steps S114 through S118

Then the MPU 30 performs the write processing of the received write command.

First, the MPU 30 stores the received command of the host interface circuit 32b in the command buffer area CBA of the RAM 31b (S114). Then, the MPU 30 adds 1 to the command memory number CN, to renew CN so as to renew the command buffer control area CA of RAM 31b (S115). Furthermore, the MPU 30 examines the drive interface circuit 32a and determines whether the signal EWA (detection of the vicinity of the end of the tape) of the control line 36b is ON or OFF (S116). If EWA is ON, the magnetic tape 16 does not arrive at the vicinity of its end, and therefore, the routine goes to step S119. If EWA is ON, since the magnetic tape 16 has arrived at the vicinity of its end, it is checked whether or not the command store area number AN of the command buffer control area CA of RAM 31b is the minimum value of 2, and if AN is the minimum value, since a renewal of AN is not necessary, the routine goes to step S119. If AN is not the minimum value, 3 is subtracted from AN to renew AN, and the routine goes to step S119.

The reason for restricting the command store area number at steps S114 through S118 is as follows.

Since the length of the magnetic tape 16 is not indefinite but definite, an end of tape mark EOT is attached to the end of the magnetic tape, and after the detection of EOT, the tape can be used only for another 3 m. Accordingly, if the prefetch command and data to be stored are larger than 3 m of the tape at the time of detection of EOT in the processing of the write command, they cannot be written on the magnetic tape and other measures must be taken. Accordingly, the signal EWA indicating the vicinity of the end of the tape is generated, for example, at a point of about 20 m before the point of detection of the EOT of the magnetic tape, whereby the storable number of write commands, that can be stored in the command buffer memory, is reduced.

For example, 64 KB of write commands, that can be stored in the command buffer memory, are gradually reduced as indicated by the solid line in FIG. 13. Alternatively, the number of write commands that can be stored can be abruptly reduced, as indicated by the dot line in FIG. 13.

Since the number of write commands that can be stored is restricted, the write commands which do not entrain write data, such as erase, write, and tape mark commands, are restricted. Therefore, all the write commands in the magnetic tape can be executed, and any hindrance to the processing of the write commands is removed.

Accordingly, when the magnetic tape arrives the vicinity of the end of the magnetic tape and the signal EWA is put ON (FIG. 12), the command store area number AN is reduced from 64 by 3 every time one write command is received from the host controller. Namely, the number of storable commands is gradually reduced.

Steps S119 and S120

Figure 14:
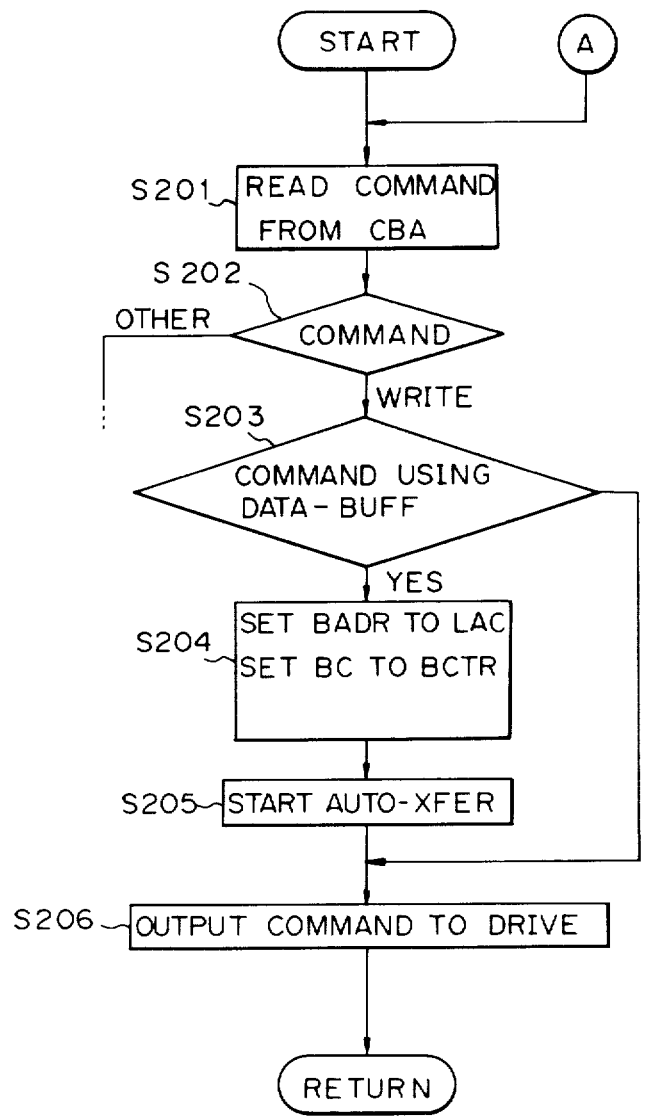
FIGS. 14 and 15 are diagrams illustrating the processing of write commands to a drive unit in one embodiment of the present invention.

The MPU 30 determines whether or not the drive control unit 2 is executing the processing (S119), and if the processing is not being executed (processing stopped), the drive starting process described hereinafter and shown in FIG. 14 is performed (S120).

Steps S121 through S123

If the drive unit 1 is executing the processing or the drive starting process is being performed, the MPU 30 determines whether or not the tape warning area signal TWA showing the detection of EOT by the drive control unit 2 has been generated on the control line 36a through the drive interface circuit 32a (S121).

If the signal TWA has been generated, the MPU 30 determines whether or not the command store number CN (number of unexecuted commands) of the command buffer control area CA of the RAM 31b is 0 (S122), and if CN is not 0, the drive unit is allowed to execute the operation until CN becomes 0. The reason for this waiting is that in the processing subsequent to EOT, the command from the host controller is made synchronous with the command executed by the drive unit.

If the signal TWA is not produced, the MPU 30 determines from the state of the data transfer control circuit 33 whether or not the transfer of store data at the above-mentioned steps S105 through S108 is overflowing because of an insufficiency of free segments of the data buffer memory. If an overflow has occurred, in order to attain the synchronism in the same manner as described above, the MPU 30 determines whether or not the command store number N (number of unexecuted commands) of the command buffer control area CA of the RAM 31b is zero (S122), and if CN is not zero, the drive control is allowed to execute the operation until CN becomes zero.

When an overflow is not generated in the buffer memory or CN becomes zero, the MPU 30 reports the termination (normal receipt or occurrence of an error) to the host controller through the host interface circuit 32b and, simultaneously, the MPU 30 turns OFF the data busy signal DBY and the routine returns to the routine of a waiting the start, shown in FIG. 7.

When the starting signal (GO) is thus given from the host controller and the write commands are given, it is determined whether or not the number of the commands received is within the command storable number AN (step S101). In contrast, if the number of the commands exceeds AN, receipt of the commands is withheld and the data busy signal DBY is not made ON.

More specifically, as shown in FIGS. 11a through 11e, if the drive control executes commands in the command buffer memory as described below with reference to FIG. 14 and the data busy signal DBY is not made ON until the number of commands falls within the command storable number AN, when the number of the commands falls within the command storable number AN, the data busy signal DBY is made ON to inform the host controller that the process is being executed.

If the signal EWA is made ON (S116), the command storable number AN is gradually reduced every time a write command is received from the host controller. When the signal TWA is generated (S121), the termination report is not made until the command store number CN is reduced to zero.

Accordingly, the command storable number AN is gradually reduced as indicated by the solid line in FIG. 13. If AN is gradually reduced in the above-mentioned manner, the host controller is not kept waiting for an extremely long time before the receipt of subsequent commands. In contrast, if AN is abruptly reduced as indicated by the broken line in FIG. 13, the host controller cannot receive subsequent commands until the drive unit completes the execution of the number commands corresponding to (number of stored commands)-(storable command number after reduction - 1). Accordingly, from the time inspection by the host controller, an abnormality at the host controller is erroneously detected because of a timeover. However, this disadvantage can be prevented by the above-mentioned gradual reduction indicated by the solid line in FIG. 13.

Similarly at steps S103 and S104, it is determined whether or not the free segments of the data buffer memory are larger than the maximum block length MAXL, and if the free segment number FSEG is larger than the maximum block length XMAL, data concerning the write transferred from the host controller is received, and if the FSEG is smaller than the maximum block length MAXL, a transfer of data is withheld and the data busy signal DBY is not made ON.

Accordingly, the drive unit executes commands in the command buffer memory as described below with reference to FIG. 14, and the data busy signal DBY is not made ON until the free segment number FSEG of the data buffer memory exceeds the maximum block length MAXL, and when FSEG becomes larger than the maximum block length MAXL, the data busy signal DBY is made ON and a transfer receipt becomes possible.

At steps S111 and S112, if the transferred block length is larger than the maximum block length MAXL, the actually transferred block length is adopted as the maximum block length MAXL at subsequent processing. Accordingly, the effects of reducing the frequency of retry and shortening the waiting time can be attained.

The processing of the write commands by the drive unit will now be described with reference to FIGS. 14 and 15.

Figure 15:
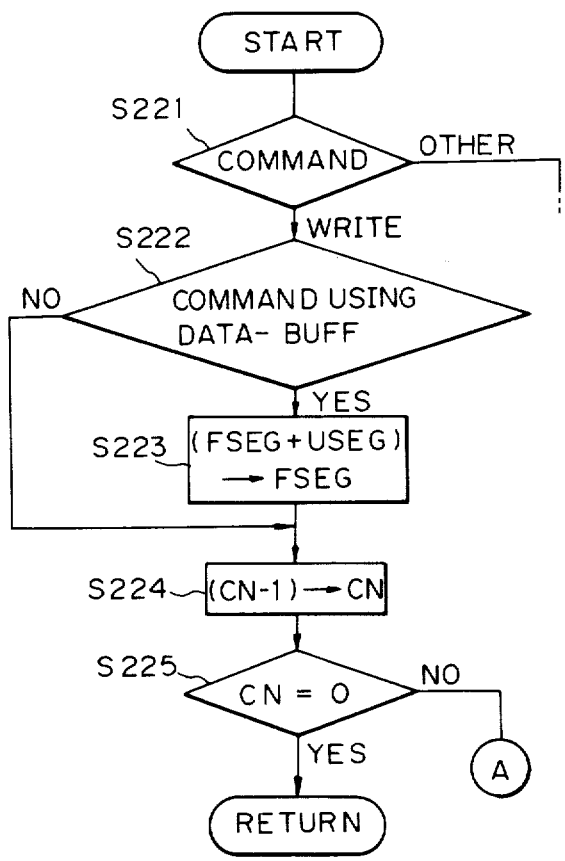

FIG. 14 is a flow chart illustrating the drive starting processing, and FIG. 15 is a flow chart illustrating the processing of termination of the drive processing.

Steps S201 and S202

Referring to FIG. 14, in order to execute the drive start, the MPU 30 reads out a command to be next executed from the command buffer memory CBA of the RAM 31b and determines whether or not the command is a write command. If the command is not a write command the routine goes to the corresponding routine for the processing of the read commands (not shown).

Steps S203 through S205

If the command is a write command it is determined whether or not the command is a command using the data buffer memory 34 (S203). If the command is a command not using the data buffer memory 34, such as erase, write, or tape mark, the routine goes to step S206.

In contrast, if the command is a command using the data buffer memory 34, the MPU 30 sets the start address BADR of the command buffer memory CBA of the RAM 31b and the byte number BC at the load address counter LAC and byte counter BCTR of the data transfer control circuit 33, respectively (S204). Furthermore, the MPU 30 starts the data transfer control circuit 33 (S205).

Step S206

Then, the MPU 30 transmits the read-out command and the starting signal (GO) to the drive control unit 2 through the drive interface circuit 32a (FIG. 11d).

On the other hand, the drive control unit 2 returns the data busy signal DBY (FIG. 11e), and if the command is a command using the buffer memory, after completion of the preparation for the data transfer, the drive control unit 2 transmits a data transfer demand to the data transfer control circuit 33 through the data transfer control signal line 37a, whereby the data transfer control circuit 33 is caused to transfer stored data of a number corresponding to the byte number of the byte counter BCTR, from the start address shown at the load address counter LAC of the data buffer memory 34 to the drive control unit 2 through the store data bus 37b, and this data is executed and written in the magnetic tape 16.

After the issuance of demands at step S206, the routine returns to the routine shown in FIG. 10.

If the execution of the write command is terminated at the drive control unit 2, the termination report is fed to the drive interface circuit 32a through the control line 36a, whereby the drive interface circuit 32a is caused to make an interruption at the MPU 30 to interrupt the processing shown in FIGS. 7 through 10. At this point, the MPU 30 starts the processing shown in FIG. 15.

Steps S221 through S223

The MPU 30 determines whether or not the command is a write command. If the command is not a write command the routine goes to the routine of the corresponding read processing (not shown). If the command is a write command the MPU 30 determines whether or not the command is a command using the data buffer memory 34 (S222). If the command is a command using the data buffer memory 34, the MPU 30 adds the use segment number USEG to the free segment number FSEG (parameter data buffer memory) of the data buffer control area DA of RAM 31b to renew the free segment number FSEG.

Steps S224 and S225

After renewal of the free segment number FSEG or when the data buffer memory 34 is not used, 1 is subtracted from the command store number CN of the command buffer control area CA of the RAM 31b to renew CN (S224). Furthermore, the MPU 30 determines whether or not the command store number CN of the RAM 31b is zero, and if CN is zero, the routine returns to the routine shown in FIG. 10. If CN is not zero, the processing of the step S201 shown in FIG. 14, and the subsequent steps, is executed.

In the foregoing manner, the drive unit sequentially executes commands stored in the command buffer memory asynchronously with the host controller.

In the foregoing embodiment, the storable number AN of write commands is gradually reduced every time a write command is received from the host controller. However, AN can be abruptly reduced as indicated by the broken line in FIG. 13 or AN can be gradually reduced every time a plurality of commands are executed on the drive side.

Moreover, the drive control unit 2 may be integrated with the command and data prefetch control unit, or the drive unit 1 may have a tape buffer memory.

As is apparent from the foregoing description, in the present invention, since the maximum block length is obtained from the receipt block length, an effect of reducing the frequency of transfer retry can be attained and, moreover, an effect of shortening the waiting time can be attained. Therefore, according to the present invention, the efficiency of the transfer of data concerning the write can be greatly improved.

Many widely different embodiments of the present invention may be constructed without departing from the spirit and scope of the present invention. It should be understood that the present invention is not limited to the specific embodiments described in this specification, except as defined in the appended claims.

What is claimed is:

1. A magnetic tape system comprising:
   drive means including a magnetic head, reels for winding a magnetic tape, having an end portion, thereon, and a drive portion for driving said reels;
   drive control means coupled to said drive means to control said drive means; and
   prefetch control means, coupled to said drive control means and to a host controller, for prefetching access commands and for counting bytes of data and having first memory means for prefetching a plurality of commands from said host controller, second memory means, having a free area free of data, for temporarily storing write data commands, having a variable number of bytes, from said host controller or data read out from said magnetic tape, said drive means being operated through said drive control means according to commands stored in said first memory means, said prefetch control means counting the number of bytes of each write data command, and when the counted byte number is less than the number of bytes of the free area of the second memory means and is larger than a maximum block length (MALX) allowing prefetching in the second memory means, the counted byte number is set as a renewed maximum block length and prefetch control of the write data command is executed based on said renewed maximum block length.

2. A magnetic tape system as set forth in claim 1, wherein said first memory means includes means for storing a storable number (AN) of write commands to be prefetched and said drive control means includes means for detecting the end portion of said magnetic tape, said prefetch control means includes means for reducing the storable number (AN) of write commands to be prefetched and stored in said first memory means in response to said drive control means detecting said end portion.

3. A magnetic tape system as set forth in claim 2, wherein the reduction of the storable command number is effected when the write data commands from said host controller are received.

4. A magnetic tape system as set forth in claim 2, wherein the reduction of the storable command number is effected to a predetermined minimum value.

* * * * *

UNITED STATES PATENT AND TRADEMARK OFFICE
CERTIFICATE OF CORRECTION

PATENT NO. : 4,788,641

DATED : November 29, 1988

INVENTOR(S) : Ishiguro et al.

It is certified that error appears in the above-identified patent and that said Letters Patent is hereby corrected as shown below:

Abstract, line 23, "nunber" should be --number--.

Abstract, line 23, "the" (second occurrence) should be deleted.

Signed and Sealed this

Thirtieth Day of May, 1989

Attest:

DONALD J. QUIGG

*Attesting Officer*

*Commissioner of Patents and Trademarks*